United States Patent
Ichkhan et al.

(10) Patent No.: US 11,204,536 B1
(45) Date of Patent: Dec. 21, 2021

(54) ULTRA-STABLE DUAL-MODE OPERATION OPTICAL CRYSTAL ASSEMBLY FOR HARMONIC CONVERSION

(71) Applicant: Raytheon Company, Waltham, MA (US)

(72) Inventors: Joseph J. Ichkhan, Redondo Beach, CA (US); Scott R. Foes, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/125,607

(22) Filed: Dec. 17, 2020

(51) Int. Cl.
*G02F 1/35* (2006.01)
*G02F 1/355* (2006.01)

(52) U.S. Cl.
CPC ............ *G02F 1/3501* (2013.01); *G02F 1/353* (2013.01); *G02F 1/3551* (2013.01); *G02F 1/3505* (2021.01)

(58) Field of Classification Search
CPC ...... G02F 1/3501; G02F 1/3505; G02F 1/353; G02F 1/3551
See application file for complete search history.

(56) References Cited

U.S. PATENT DOCUMENTS

| | | | | |
|---|---|---|---|---|
| 5,353,292 A | * | 10/1994 | Motegi | G02F 1/37 372/21 |
| 5,935,467 A | * | 8/1999 | Unternahrer | G02F 1/3501 219/390 |
| 6,414,784 B1 | * | 7/2002 | Oosako | G02F 1/3501 359/326 |
| 6,532,100 B1 | * | 3/2003 | Partanen | G02F 1/35 359/326 |
| 6,744,547 B2 | * | 6/2004 | Ikeda | G02F 1/3501 359/238 |
| 7,142,354 B2 | * | 11/2006 | Kojima | G02F 1/3501 359/326 |
| 7,715,451 B2 | * | 5/2010 | Van Saarloos | A61F 9/00804 372/21 |
| 9,140,958 B2 | * | 9/2015 | Harada | G02F 1/3558 |
| 9,482,928 B2 | * | 11/2016 | Perkins | G02F 1/353 |

(Continued)

FOREIGN PATENT DOCUMENTS

| | | | | |
|---|---|---|---|---|
| CN | 111367331 A | * | 7/2020 | ............. G05D 23/20 |
| JP | 10268367 A | * | 10/1998 | ............... G02F 1/37 |
| WO | 2016/044422 A1 | | 3/2016 | |

OTHER PUBLICATIONS

Afzal et al., "The Geoscience Laser Altimeter System (GLAS) Laser Transmitter," IEEE Journal of Selected Topics in Quantum Electronics, vol. 13, No. 3, May/Jun. 2007, 26 pages.

(Continued)

*Primary Examiner* — Daniel Petkovsek

(57) ABSTRACT

An apparatus includes a non-linear optical crystal configured to perform harmonic wavelength conversion. The apparatus also includes first and second heaters contacting opposite sides of the optical crystal, where the first and second heaters are configured to heat the optical crystal. The apparatus further includes first and second backing plates configured to hold the first and second heaters in contact with the optical crystal. The apparatus also includes an internal mount defining a space configured to receive at least a portion of the optical crystal. In addition, the apparatus includes an external cover around at least a portion of the internal mount.

20 Claims, 10 Drawing Sheets

(56) References Cited

U.S. PATENT DOCUMENTS

2004/0146076 A1     7/2004   Dudley et al.
2008/0291528 A1*   11/2008   Susumu ................ G02F 1/3501
                                                                     359/326

OTHER PUBLICATIONS

Wikipedia, "ADM-Aeolus," Oct. 2020, 6 pages.
Rim et al., "Geoscience Laser Altimeter System (GLAS), Algorithm Theoretical Basis Document Version 2.0, Precision Orbit Determination (POD)," Feb. 1999, 89 pages.
Hovis, "Qualification of the Laser Transmitter for the CALIPSO Aerosol Lidar Mission," Proc. of SPIE, vol. 6100, 2006, 10 pages.
"TPL Doubler," Minioptic Technology, Inc., Jul. 2013, 10 pages.
"Harmonic Generators," Minioptic Technology, Inc., Jul. 2013, 3 pages.
Hovis et al., "Laser Transmitter for the BalloonWinds Program," Fibertek, Inc., Feb. 2005, 23 pages.
"Crystal →NLO Crystals→LBO", Apr. 2009, 5 pages.
Wikipedia, "Optical frequency multiplier," Jan. 2020, 1 page.
"Potassium Titanyl Phosphate—KTP," Northrop Grumman Synoptics, 2011, 4 pages.
Afzal et al., "The Geoscience Laser Altimeter System Laser Transmitter," Optical Society of America, 1999, 3 pages.

* cited by examiner

ULTRA-STABLE DUAL-MODE OPERATION OPTICAL CRYSTAL ASSEMBLY FOR HARMONIC CONVERSION

TECHNICAL FIELD

This disclosure relates generally to optical wavelength conversion. More specifically, this disclosure relates to an ultra-stable dual-mode operation optical crystal assembly for harmonic conversion.

BACKGROUND

Harmonic wavelength conversion refers to a process in which a wavelength of light passing through a non-linear optical crystal is altered, often by doubling or tripling the frequency of the light to a harmonic wavelength. High-quality harmonic wavelength conversion devices are very difficult to implement in stable, compact, ruggedized packages. Among other reasons, this is because high-quality harmonic wavelength conversion devices often require ultra-precise thermal and positioning control of their non-linear optical crystals. Depending on the implementation, an optical crystal can be either critically phased matched (CPM) or non-critically phase matched (NCPM) (but not both) to wavelength-convert light passing through the optical crystal harmonically. This problem can be compounded because CPM typically requires precise optical alignment of an optical crystal, while NCPM typically requires elevated temperature operation of an optical crystal.

SUMMARY

This disclosure provides an ultra-stable dual-mode operation optical crystal assembly for harmonic conversion.

In a first embodiment, an apparatus includes a non-linear optical crystal configured to perform harmonic wavelength conversion. The apparatus also includes first and second heaters contacting opposite sides of the optical crystal, where the first and second heaters are configured to heat the optical crystal. The apparatus further includes first and second backing plates configured to hold the first and second heaters in contact with the optical crystal. The apparatus also includes an internal mount defining a space configured to receive at least a portion of the optical crystal. In addition, the apparatus includes an external cover around at least a portion of the internal mount.

In a second embodiment, a method includes placing a non-linear optical crystal within an internal mount defining a space configured to receive at least a portion of the optical crystal, where the optical crystal is configured to perform harmonic wavelength conversion. The method also includes positioning the optical crystal between first and second heaters, where the first and second heaters contact opposite sides of the optical crystal and are configured to heat the optical crystal. The method further includes using first and second backing plates to hold the first and second heaters in contact with the optical crystal. In addition, the method includes placing an external cover around at least a portion of the internal mount.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
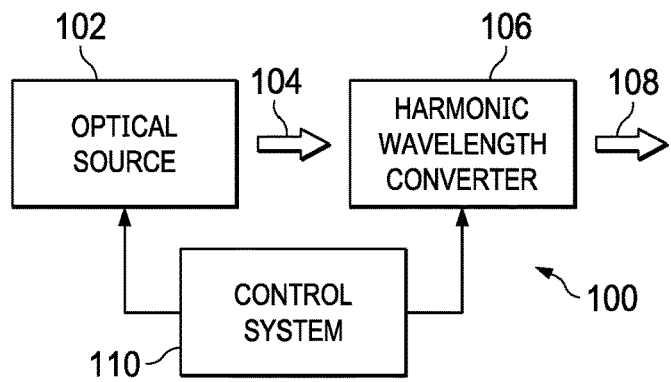
FIG. 1 illustrates an example system for harmonic wavelength conversion in accordance with this disclosure.

FIGS. 1 through 11, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, harmonic wavelength conversion refers to a process in which a wavelength of light passing through a non-linear optical crystal is altered, often by doubling or tripling the frequency of the light to a harmonic wavelength. High-quality harmonic wavelength conversion devices are very difficult to implement in stable, compact, ruggedized packages. Among other reasons, this is because high-quality harmonic wavelength conversion devices often require ultra-precise thermal and positioning control of their non-linear optical crystals. Depending on the implementation, an optical crystal can be either critically phased matched (CPM) or non-critically phase matched (NCPM) (but not both) to wavelength-convert light passing through the optical crystal harmonically. This problem can be compounded because CPM typically requires precise optical alignment of an optical crystal, while NCPM typically requires elevated temperature operation of an optical crystal.

Common approaches often use uniquely-tailored physical designs that support only one specific harmonic conversion process (CPM or NCPM), which permits only a single mode of operation for any given physical configuration. Some approaches that support CPM use adjacent adjustable optical elements and external tooling to align crystal axes and compensate for beam walk-off errors. Other approaches that support NCPM use elevated temperature control in a much more elaborate thermal control configuration that results in different physical packaging arrangements than for CPM designs. Many available harmonic generators are excessively large and lack environmental robustness for compact applications. For instance, some commercial units are large and require complex electronics for alignment and operation control.

This disclosure provides an ultra-stable dual-mode operation optical crystal assembly for harmonic conversion. As described in more detail below, the optical crystal assembly allows for harmonic wavelength conversion while supporting both CPM and NCPM modes of operation in the same physical package. Among other things, the optical crystal assembly includes a ruggedized precision opto-mechanical module that contains a non-linear optical crystal. The optical crystal assembly has a compact form factor suitable for crystal mounting within a laser beamline and may provide near adiabatic crystal thermal control (such as to within 0.3° C.) given reasonable host thermal system maintenance. The optical crystal assembly can also incorporate closed-loop thermal control (such as absolute crystal temperature and gradient/uniformity control) to within precise tolerances for conversion efficiency and maintenance to support both CPM and NCPM modes of operation. The optical crystal assembly can further incorporate built-in precision mechanical alignment features, which can be used to align an incoming beam to a desired crystal axis and down-stream beamline optics.

The optical crystal assembly may be used in various types of applications, such as space, commercial, and defense-related applications. For example, numerous laser beamlines/systems may require harmonic conversion of one wavelength to another and may benefit from the optical crystal assembly described here. As a particular example, in some embodiments, the optical crystal assembly can be used for wavelength up-conversion within an optical parametric amplifier (OPA). Moreover, in some embodiments, the optical crystal assembly can be fabricated using contamination-free materials and processes, such as through the use of adhesive-free crystal mounting and inert ceramic heaters. Among other things, this can help to promote a high mean time between failures (MTBF) and mitigate laser-induced coating damage.

FIG. 1 illustrates an example system 100 for harmonic wavelength conversion in accordance with this disclosure. As shown in FIG. 1, the system 100 includes an optical source 102, which is used to generate an input optical signal 104. The optical source 102 includes any suitable structure configured to generate at least one optical signal. In some embodiments, the optical source 102 may represent a continuous wave (CW) or pulsed laser. The input optical signal 104 includes any suitable beam of optical energy that will undergo wavelength conversion. The input optical signal 104 may have any suitable frequency/wavelength, power level, pulse duration, or other characteristics. As a particular example, the input optical signal 104 may have a cross-sectional size of about 20 millimeters by about 7 millimeters.

The input optical signal 104 is provided to a harmonic wavelength converter 106, which shifts the wavelength of the input optical signal 104 and produces an output optical signal 108. The harmonic wavelength converter 106 includes a non-linear optical crystal, which performs the wavelength conversion so that the output optical signal 108 is a harmonic of the input optical signal 104. Example embodiments of the harmonic wavelength converter 106 are provided below. The output optical signal 108 may have any suitable frequency/wavelength, power level, pulse duration, or other characteristics. Also, the output optical signal 108 may be provided to any other suitable components for use. As a particular example, the input optical signal 104 may have a wavelength of about 1064 nanometers, and the output optical signal 108 may have a wavelength of about 532 nanometers or about 266 nanometers.

A control system 110 can be used to control the operation of the optical source 102 and the harmonic wavelength converter 106. For example, the control system 110 may be used to control the generation of the input optical signal 104 by the optical source 102, such as by controlling the optical source 102 in order to achieve desired characteristics of the input optical signal 104 like frequency/wavelength, power level, or pulse duration. The control system 110 may also be used to control the operation of ceramic heaters or other components of the harmonic wavelength converter 106 in order to control the harmonic wavelength conversion process. The control system 110 includes any suitable structure configured to control one or more other components of a system, such as one or more microprocessors, microcontrollers, digital signal processors (DSPs), application-specific integrated circuits (ASICs), or field-programmable gate arrays (FPGAs).

Although FIG. 1 illustrates one example of a system 100 for harmonic wavelength conversion, various changes may be made to FIG. 1. For example, the harmonic wavelength converter 106 may be used in any other suitable system. Also, various components shown in FIG. 1 may be combined, further subdivided, replicated, omitted, or rearranged and additional components may be added according to particular needs. As a particular example, multiple harmonic wavelength converters 106 may be placed in series and used to perform multiple wavelength conversions in different stages. As one specific example of this, multiple harmonic wavelength converters 106 may be used in an OPA assembly to perform wavelength up-conversion.

Figure 2:
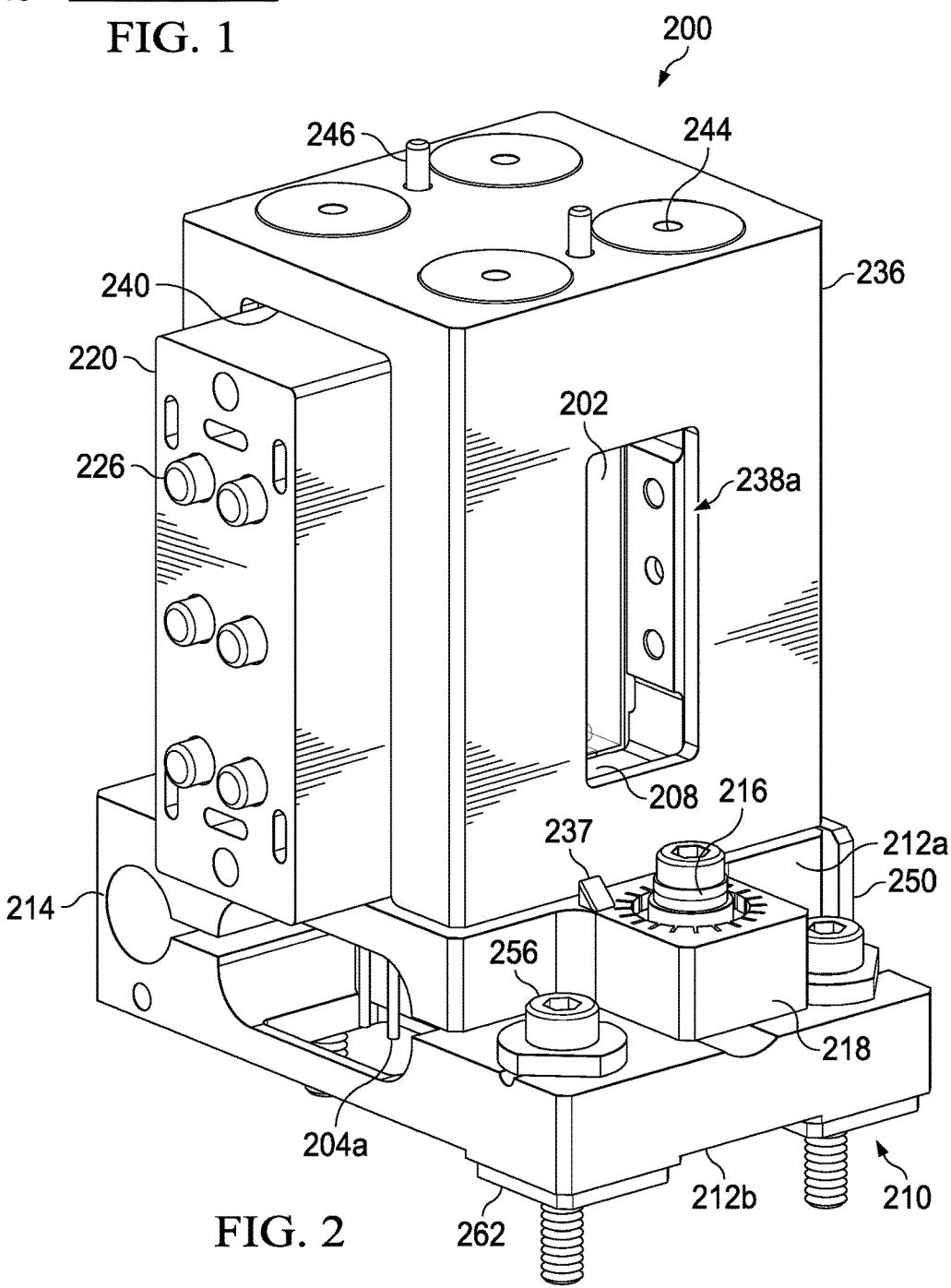
FIGS. 2 through 6 illustrate an example ultra-stable dual-mode operation optical crystal assembly for harmonic conversion in accordance with this disclosure.
Figure 3:
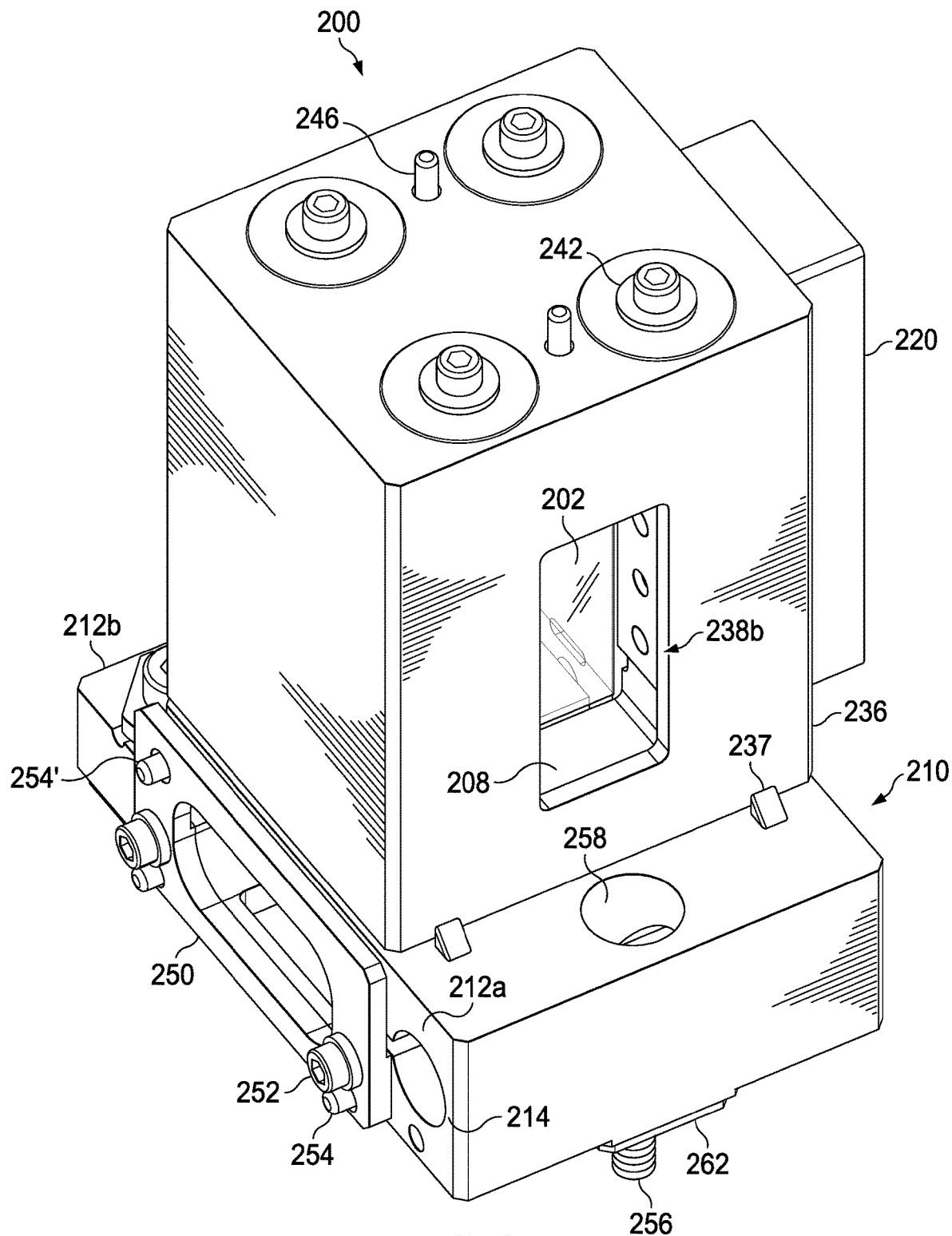
Figure 4:
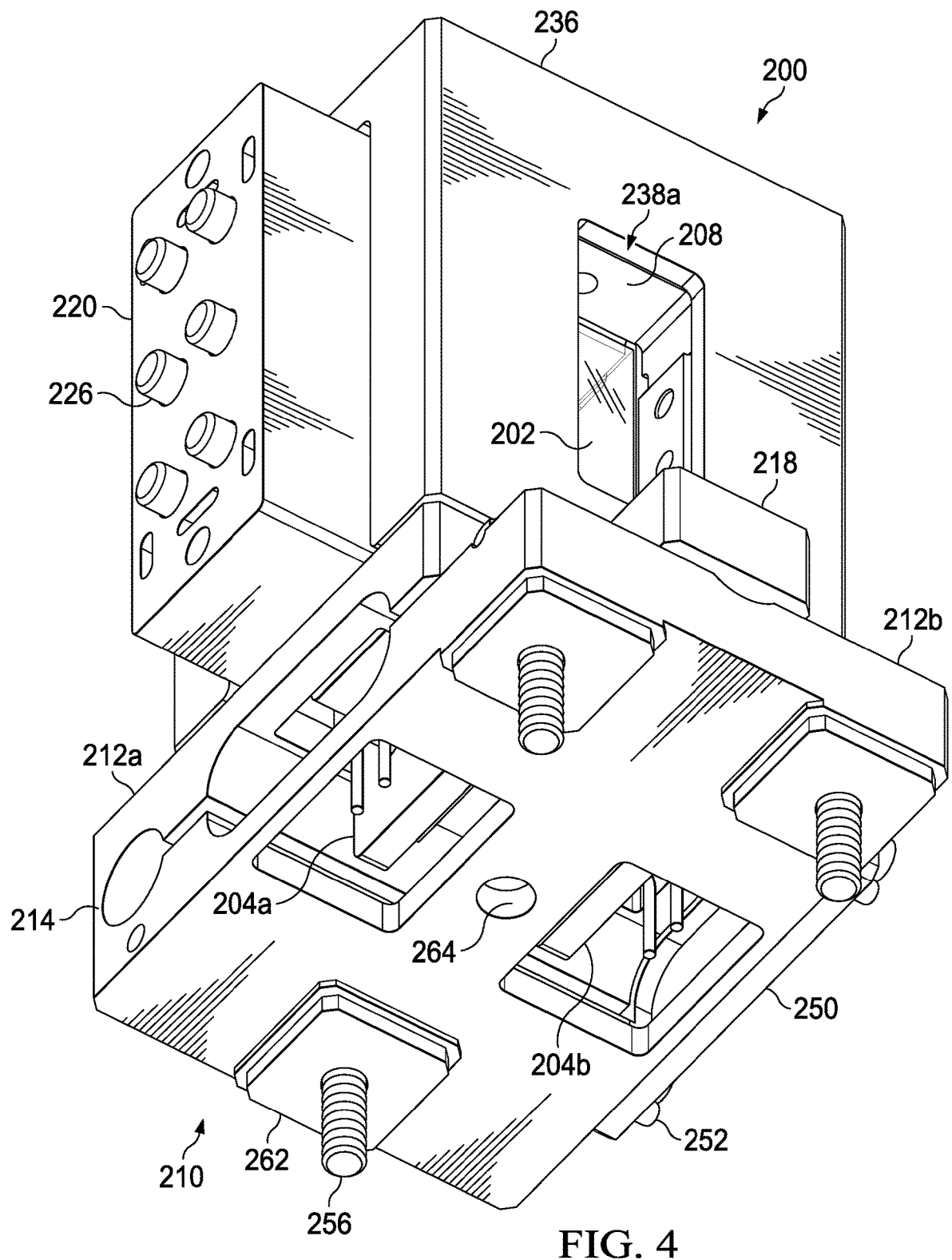
Figure 5:
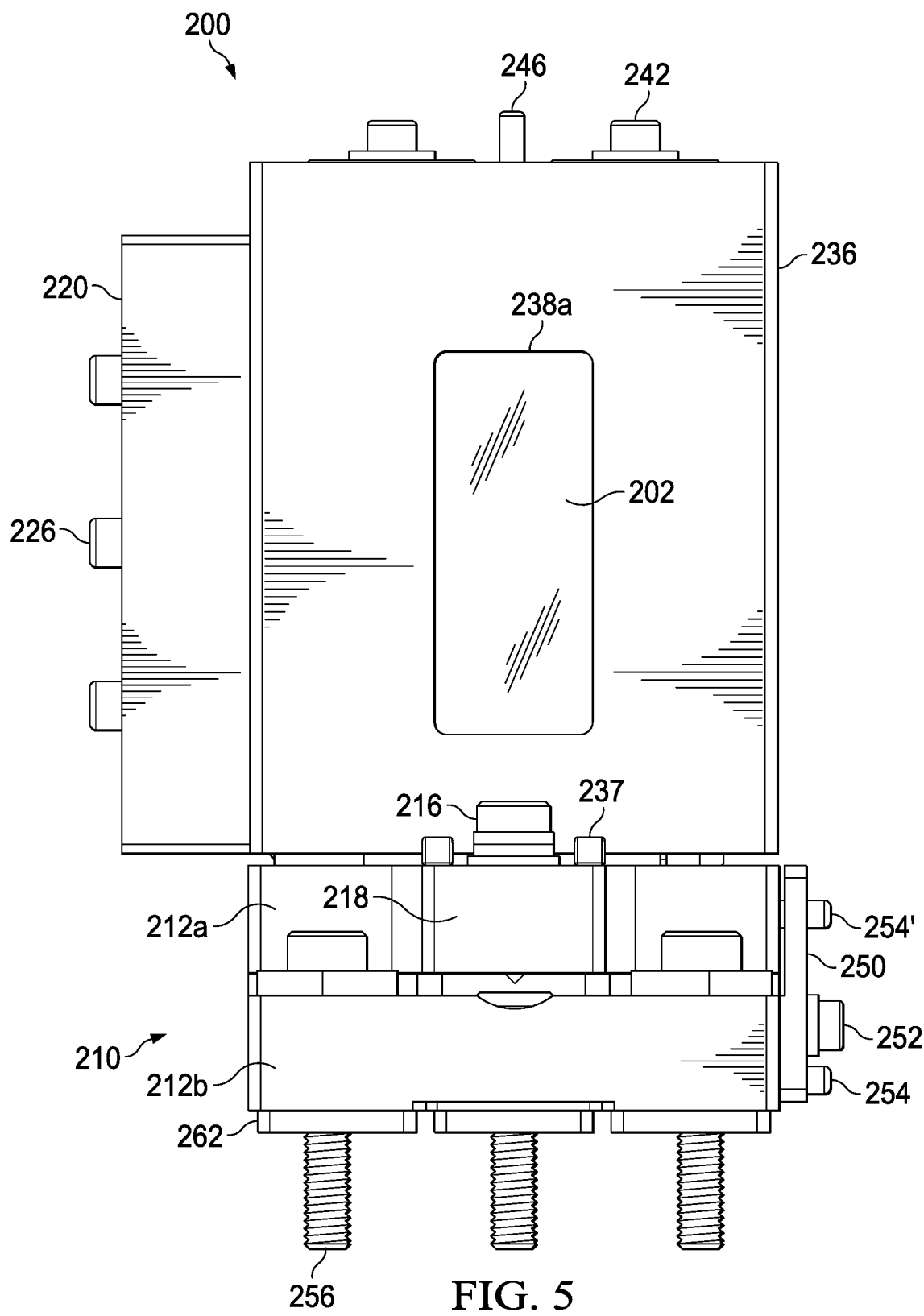
Figure 6:
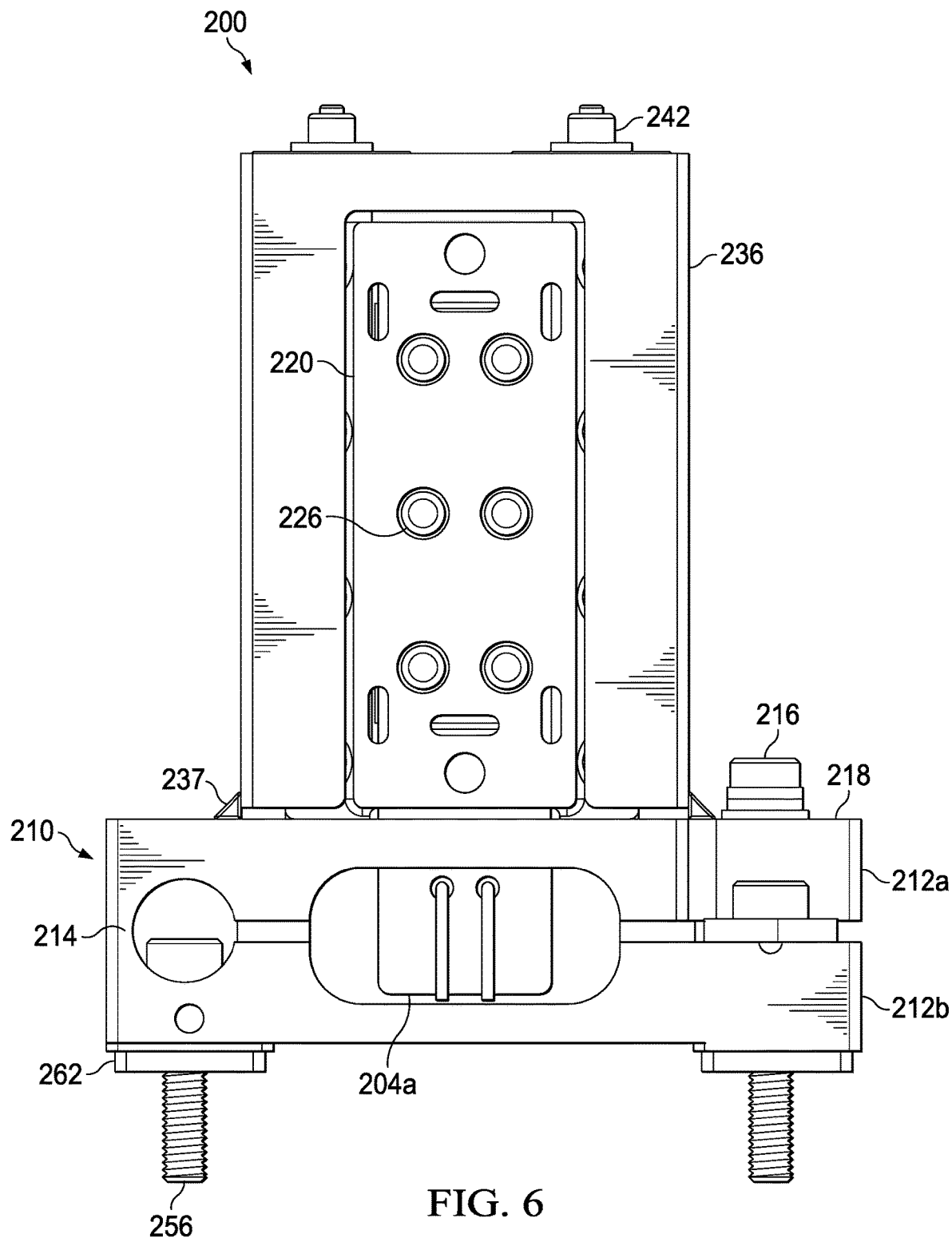
Figure 7:
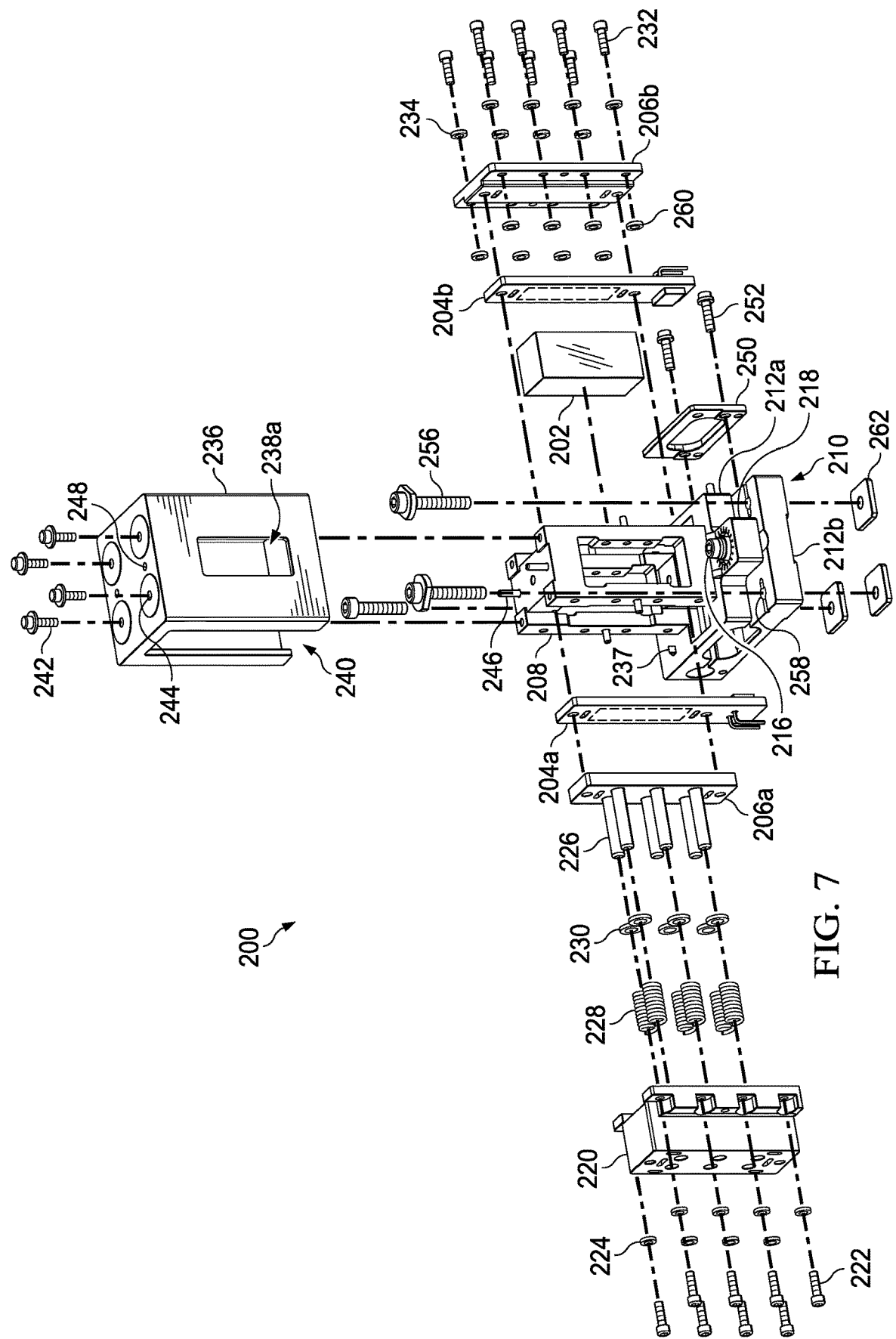
FIG. 7 illustrates an example exploded view of the ultra-stable dual-mode operation optical crystal assembly for harmonic conversion in accordance with this disclosure.

FIGS. 2 through 6 illustrate an example ultra-stable dual-mode operation optical crystal assembly 200 for harmonic conversion in accordance with this disclosure. More specifically, FIG. 2 illustrates a first top perspective view of the optical crystal assembly 200, FIG. 3 illustrates a second top perspective view of the optical crystal assembly 200, and FIG. 4 illustrates a bottom perspective view of the optical crystal assembly 200. Also, FIG. 5 illustrates a front view of the optical crystal assembly 200, and FIG. 6 illustrates a side view of the optical crystal assembly 200. FIG. 7 illustrates an example exploded view of the ultra-stable dual-mode operation optical crystal assembly 200 for harmonic conversion in accordance with this disclosure. The optical crystal assembly 200 here represents one example embodiment of the harmonic wavelength converter 106 described above. For ease of explanation, the optical crystal assembly 200 may be described as being used as the harmonic wavelength converter 106 in the system 100 of FIG. 1. However, the optical crystal assembly 200 may be used in any other suitable system.

As shown in FIGS. 2 through 7, the optical crystal assembly 200 includes a non-linear optical crystal 202. The optical crystal 202 represents a block of crystalline material that causes a wavelength shift of an input optical signal 104 passing through the optical crystal 202. The wavelength shift causes an output optical signal 108 to have a different wavelength and frequency relative to the input optical signal 104, such as by doubling or tripling the frequency to a harmonic. The optical crystal 202 may be formed from any suitable material(s) configured to cause a wavelength shift in an optical signal. Example materials may include potassium titanyl phosphate ($KTiOPO_4$, also known as KTP), lithium triborate ($LiB_3O_5$, also known as LBO), and rubidium titanyl arsenate ($RbTiOAsO_4$, also known as RTA). The optical crystal 202 may also be formed in any suitable manner and have any suitable size, shape, and dimensions. Note that some embodiments of the optical crystal assembly 200 may be able to accommodate optical crystals 202 of different sizes.

The optical crystal 202 is sandwiched between two heaters 204a-204b. The heaters 204a-204b can be used to increase the temperature of the optical crystal 202 as needed or desired. For example, the optical crystal assembly 200 may operate in a CPM mode or an NCPM mode. In CPM mode, the optical crystal 202 may be used while at an ambient temperature, such as about 20° C. to about 30° C. In NCPM mode, the optical crystal 202 typically requires elevated temperature operation, such as to about 149° C., and the heaters 204a-204b can be used to increase the temperature of the optical crystal 202. The heaters 204a-204b can also provide substantially uniform heating on both sides of the optical crystal 202 when activated. This can help to ensure that a temperature gradient in the optical crystal 202 is kept very low, such as about 0.3° C. or less.

Each heater 204a-204b includes any suitable structure configured to heat an optical crystal, such as a ceramic heater. In this example, each of the heaters 204a-204b includes multiple wires that couple the heater 204a-204b to an external power supply or controller, such as to the control system 110. Each heater 204a-204b may also carry one or more resistance thermometer detectors (RTDs) or other temperature sensors, which can output temperature measurements to a local controller on the heater 204a-204b or to the control system 110 for use in controlling the operation of the heater 204a-204b. As a particular example, the local controller of each heater 204a-204b or the control system 110 may implement one or more proportional-integral-derivative (PID) control loops in order to control the heating provided by each heater 204a-204b based on its temperature measurements.

Backing plates 206a-206b are used to secure the heaters 204a-204b against the optical crystal 202 on opposite sides of the optical crystal 202. This holds the optical crystal 202 in place and prevents shifting or other undesired movement of the optical crystal 202 during use. Each backing plate 206a-206b can be formed from any suitable material(s). For example, the backing plate 206a may be formed from one or more thermally-insulative materials, and the backing plate 206b may be formed from one or more metals. Each backing plate 206a-206b can also be formed in any suitable manner and have any suitable size, shape, and dimensions.

The optical crystal 202 is held by the heaters 204a-204b and the backing plates 206a-206b within an internal mount 208. The internal mount 208 here represents a frame that defines an interior space into which at least a portion of the optical crystal 202 can be placed. As described in more detail below, the optical crystal 202 can be said to "float" within the internal mount 208 because the optical crystal 202 does not contact the internal mount 208 and is instead held in place using the forces applied to the heaters 204a-204b. The internal mount 208 may be formed from any suitable material(s), such as one or more metals. The internal mount 208 can also be formed in any suitable manner and have any suitable size, shape, and dimensions.

The internal mount 208 includes or is attached to a base 210, which forms a bottom portion of the optical crystal assembly 200. The base 210 supports various kinematic adjustment features and mounting options, as well as flexured adjustments for crystal axis tuning. The base 210 can be secured to another structure in order to secure the optical crystal 202 at a desired location in a larger system, such as the system 100. In this example, the base 210 is split into first and second portions 212a-212b along a substantial portion of the length of the base 210. The first portion 212a of the base 210 is integral with or attached to the internal mount 208, and the second portion 212b of the base 210 may be configured to contact or rest on another structure. The base 210 may be formed from any suitable material(s), such as one or more metals. The base 210 can also be formed in any suitable manner and have any suitable size, shape, and dimensions.

In this example, the first portion 212a of the base 210 is movable somewhat relative to the second portion 212b of the base 210. More specifically, one end 214 of the base 210 can connect the first and second portions 212a-212b together and effectively function as a hinge that allows the first portion 212a to move slightly towards and away from the second portion 212b, thereby providing for very fine elevation adjustment of the optical crystal 202. The separation between the first and second portions 212a-212b of the base 210 can be precisely controlled using a push-pull adjuster 216, which is located within a narrower section 218 of the first portion 212a of the base 210 in this example. The push-pull adjuster 216 is configured to be rotated in one direction to push the first portion 212a farther away from the second portion 212b and rotated in the opposite direction to pull the first portion 212a closer towards the second portion 212b. This represents one degree of freedom that can be used to help position and align the optical crystal 202 as needed or desired in a larger system. The push-pull adjuster 216 includes any suitable structure configured to push the first and second portions 212a-212b of the base 210 farther apart and pull the first and second portions 212a-212b of the base 210 closer together.

In this example, the backing plate 206a pushes the heater 204a against the optical crystal 202 based on a preload spring force applied to the backing plate 206a. The amount of preload can be tailored based on the desired retention force for the optical crystal 202 and the stress that is placed on the optical crystal 202 (ideally so that the stress does not exceed the birefringence threshold of the optical crystal 202). This may allow for use of the optical crystal assembly 200 in a desired application based on expected forces, such as in a tactical environment or during a launch into space. Here, this preload spring force is provided using a spring cover 220 that can be secured to the internal mount 208 using various connectors 222, such as bolts, and associated washers 224. The spring cover 220 defines an interior space through which multiple stubs 226 can pass, and springs 228 can be placed over the stubs 226. Spacers 230 can be used to adjust the spring preload provided by the springs 228.

After the spacers 230 and springs 228 are placed over the stubs 226, the spring cover 220 can be placed over the spacers 230 and springs 228, and the ends of the stubs 226 may pass through openings in the spring cover 220. When the spring cover 220 is secured to the internal mount 208 using the connectors 222, the springs 228 are partially compressed by the spring cover 220 and apply the preload spring force against the backing plate 206a, which pushes the heater 204a against the optical crystal 202. The backing plate 206b can be secured to the internal mount 208 using connectors 232 and associated washers 234. In this example, no spring force is applied by the backing plate 206b to the heater 204b, and the heater 204b can form a fixed surface up against which the optical crystal 202 is pushed by the backing plate 206a and the heater 204a.

The spring cover 220 includes any suitable structure configured to define a space for and partially compress springs 228 used to apply a spring force. The stubs 226 include any suitable structures on which springs 228 can be placed and secured. The springs 228 include any suitable structures configured to apply spring forces when compressed. Each of the spring cover 220, stubs 226, and springs 228 can be formed from any suitable material(s), such as one or more metals. Each of the spring cover 220, stubs 226, and springs 228 can also be formed in any suitable manner and have any suitable size, shape, and dimensions. The connectors 222, 232 and washers 224, 234 represent example mechanisms for securing components together here, although any other suitable connectors or other mechanisms may be used to secure components together. The spacers 230 can be formed from any suitable material(s), such as one or more metals. The spacers 230 can also be formed in any suitable manner and have any suitable size, shape, and dimensions.

An external cover 236 can be placed over the internal mount 208 after the optical crystal 202 has been secured in place within the internal mount 208. The external cover 236 can be designed to enhance or minimize radiative and convective coupling between the optical crystal 202 and an external environment. In some embodiments, the external cover 236 represents a low-emissivity structure that can be placed around the optical crystal 202 and the heaters 204a-204b in order to reduce or minimize heat transfer into and out of the external cover 236. The external cover 236 may therefore support substantially adiabatic operation of the optical crystal 202, meaning the heating of the optical crystal 202 is based substantially or entirely on the operation of the heaters 204a-204b (which is useful in NCPM mode). The presence of heat or the lack thereof outside the external cover 236 may have little or no effect on the heating of the optical crystal 202. For this reason, the external cover 236 may sometimes be said to form or define an "oven" cover for the optical crystal 202. When used in CPM mode, the external cover 236 can help prevent contamination or fouling of the optical crystal 202, even if the external cover 236 is not used (or used significantly) for temperature control. The external cover 236 may be formed from any suitable material(s) having a desired emissivity, such as titanium with gold plating. The external cover 236 can also be formed in any suitable manner and have any suitable size, shape, and dimensions. Bond locations 237 may be provided at various locations of the base 210 in order to define where the external cover 236 can be welded or otherwise coupled to the base 210.

In this example, the external cover 236 defines multiple beam apertures 238a-238b, which represent openings in the external cover 236 through which the input optical signal 104 and the output optical signal 108 may respectively pass. In some embodiments, the beam apertures 238a-238b can be specifically tailored to the shapes of the optical signals 104, 108 to be used with the optical crystal assembly 200. In this example, the beam apertures 238a-238b are rectangular, although the beam apertures 238a-238b may be circular or have any other desired shape(s). Also, the external cover 236 defines a slot 240 that allows a portion of the spring cover 220 to pass outside the external cover 236. Note, however, that the external cover 236 may fit over the spring cover 220 if needed or desired. In this example, the external cover 236 is attached to the internal mount 208 using connectors 242, such as bolts, that fit through corresponding holes 244 in the external cover 236. In addition, note that dowel pins 246 may be inserted into openings of the internal mount 208 and pass through openings 248 in the external cover 236. This allows portions of the dowel pins 246 to extend outside the external cover 236 and be inserted into one or more other components, such as a mirror used to test the alignment of the optical crystal 202 in a larger system.

As noted above, the separation of the two portions 212a-212b of the base 210 is adjustable based on the use of the push-pull adjuster 216. In order to prevent excessive adjustment of the separation of the portions 212a-212b, a plate 250 can be secured to the base 210. The plate 250 here takes the form of a rectangular annulus, although any other suitable shape may be used here. The plate 250 can be secured to the base 210 using connectors 252, such as bolts. Also, dowel pins 254 and 254' may be inserted into openings of the base 210 and pass through corresponding openings in the plate 250. While two lower dowel pins 254 may pass through openings of approximately equivalent size in the plate 250, the upper dowel pin 254' passes through a larger opening in the plate 250. This larger size allows the first portion 212a of the base 210 to move based on operation of the push-pull adjuster 216 to a limited extent in order to achieve the desired position or orientation of the optical crystal 202. However, any attempt to push the first portion 212a too far away from the second portion 212b or to pull the first portion 212a too close to the second portion 212b may cause the upper dowel pin 254' to contact the plate 250 and prevent further movement.

In this example, various connectors 256 can pass through corresponding openings 258 in the base 210 and can be used to secure the base 210 to an external structure. Here, the connectors 256 represent bolts used in conjunction with notched integrated washers, although any other suitable connectors may be here. Also, in this example, the opening 258 shown in FIG. 3 includes a counterbore that allows all three of the connectors 256 to be of generally the same length, although this need not be the case.

In order to provide improved thermal isolation in the optical crystal assembly 200, thermal isolators 260 and 262 may be used in the optical crystal assembly 200. The thermal isolators 260 help to thermally separate the heater 204b from the backing plate 206b, which helps to reduce or minimize heat transfer between the heater 204b and the backing plate 206b. As a result, all or substantially all of the heat generated by the heater 204b can be provided into the optical crystal 202. The thermal isolators 262 help to thermally separate the base 210 from an underlying structure, which helps to reduce or minimize heat transfer between the base 210 and the underlying structure. Each thermal isolator 260 and 262 may be formed from any suitable thermally-insulative material(s), such as glass-bonded mica. Each thermal isolator 260 and 262 may also be formed in any suitable manner and have any suitable size, shape, and dimensions. In some embodiments, the bottom surface of the base 210 may be recessed in order to receive and hold the thermal isolators 262 in a desired orientation.

The bottom surface of the base 210 also includes an opening 264, which may receive a dowel pin. The dowel pin may be inserted into or form a part of an underlying structure and be inserted into the opening 264, or the dowel pin may be inserted into the opening 264 and then inserted into an opening of the underlying structure. However implemented, this allows the optical crystal assembly 200 to rotate about a central location in the larger system, which represents another degree of freedom that can be used to help position and align the optical crystal 202 as needed or desired in the larger system.

Figure 8:
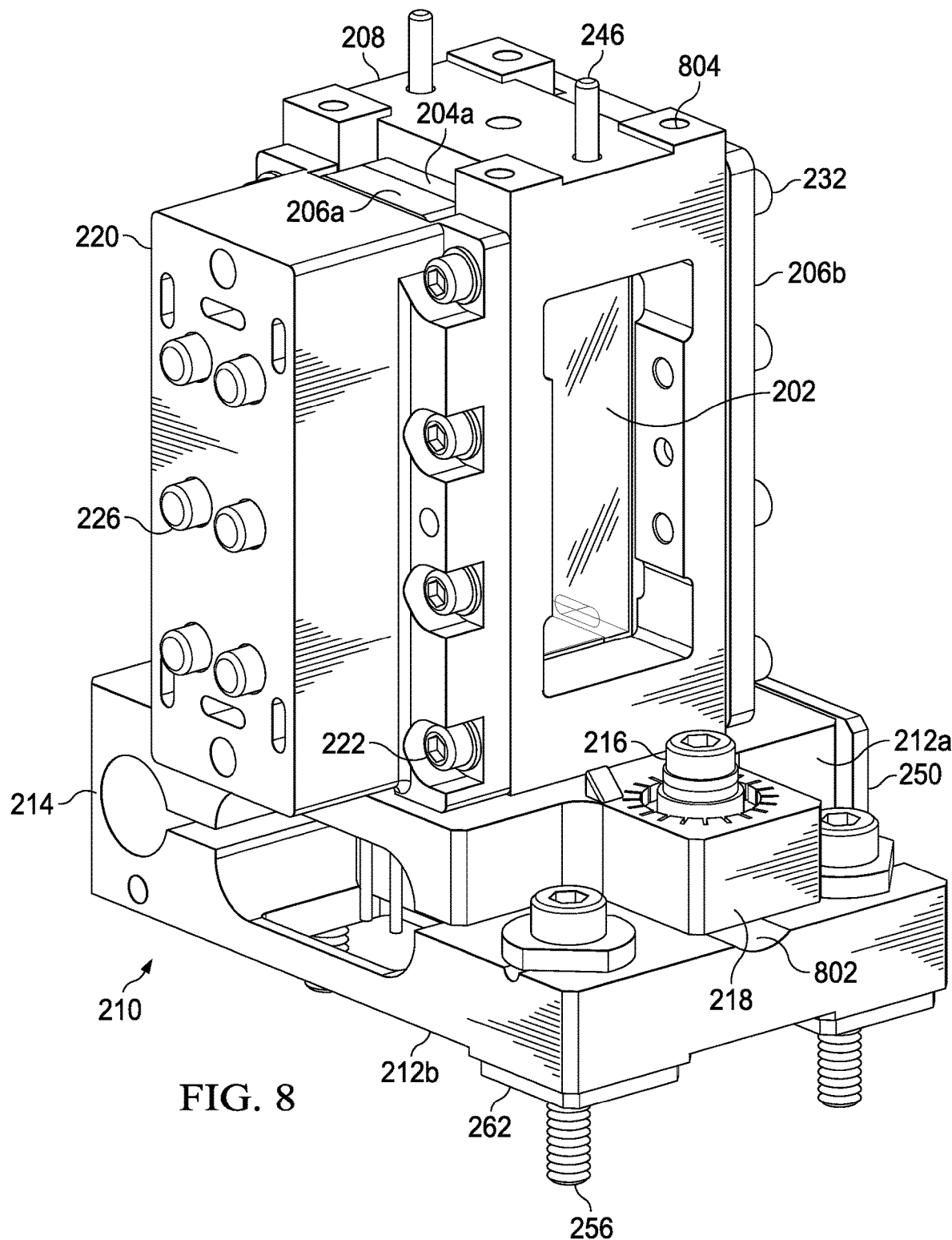
FIGS. 8 through 10 illustrate example portions of the ultra-stable dual-mode operation optical crystal assembly for harmonic conversion in accordance with this disclosure.
Figure 9:
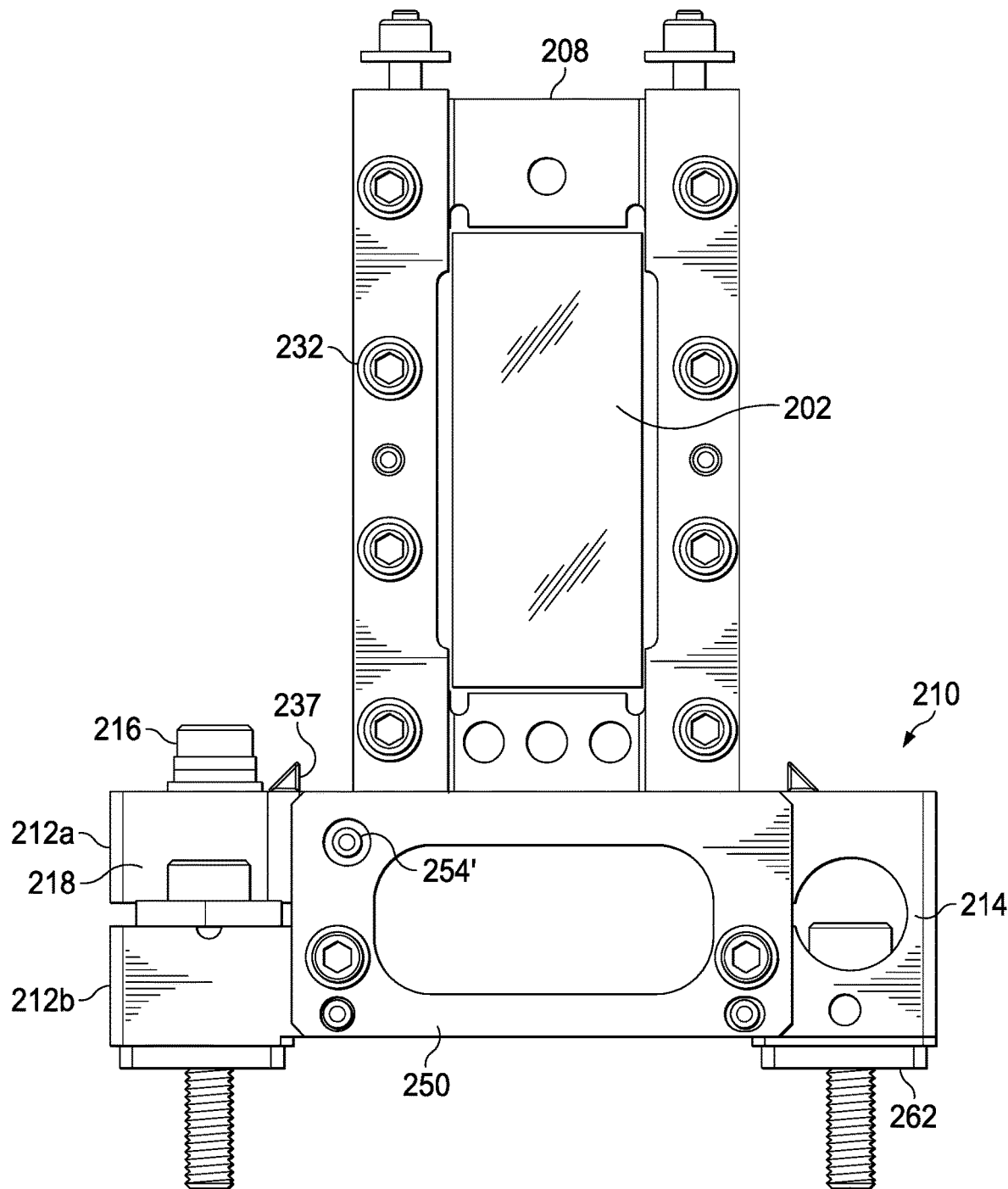
Figure 10:
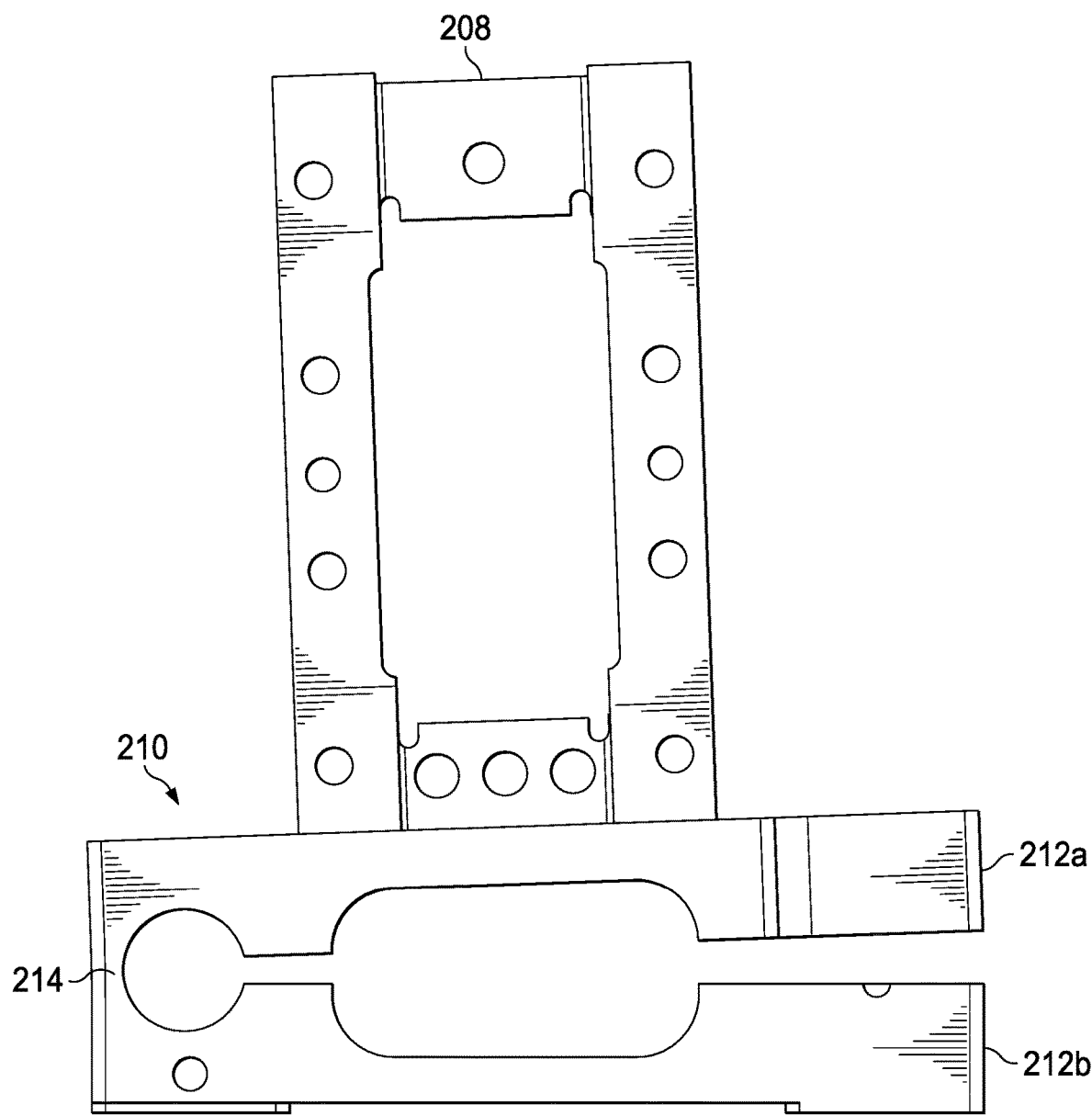

FIGS. 8 through 10 illustrate example portions of the ultra-stable dual-mode operation optical crystal assembly 200 for harmonic conversion in accordance with this disclosure. In FIG. 8, an assembled optical crystal assembly 200 is shown, except the external cover 236 has been omitted. Note that a groove 802 in the second portion 212b of the base 210 may be used to help prevent side-to-side displacement of the first portion 212a of the base 210 relative to the second portion 212b of the base 210. Also, it can be seen in this assembled view how the optical crystal 202 is sandwiched between other components and held within the internal mount 208. In addition, the internal mount 208 includes various openings 804, which are configured to receive the connectors 242 that can (among other things) attach the external cover 236 to the internal mount 208.

In FIG. 9, it can be seen how the optical crystal 202 is positioned within the internal mount 208 and does not contact the internal mount 208. Instead, as noted above, the optical crystal 202 is supported by the heaters 204a-204b. As a result, the major surfaces of the optical crystal 202 contact the heaters 204a-204b, and the minor surfaces of the optical crystal 202 (top, bottom, and sides) may be free and uncovered, which can help to mitigate local thermal gradients. Also, it can be clearly seen how the dowel pin 254' fits within the larger opening of the plate 250 and can contact the plate 250 if needed to prevent excessive movement of the portions 212a-212b of the base 210. In FIG. 10, it can be seen how the separation between the portions 212a-212b of the base 210 can be adjusted in order to control the tilt of the internal mount 208 (which would thereby control the tilt of the optical crystal 202 itself).

Overall, the optical crystal assembly 200 may have any suitable size, shape, and dimensions. In some embodiments, the optical crystal assembly 200 may have overall dimensions of about 1.8 inches (about 4.572 centimeters) by about 1.7 inches (about 4.318 centimeters) by about 2.4 inches (about 6.096 centimeters) and weight about 7.4 ounces (about 209.79 grams). This can allow for harmonic wavelength conversion to occur within a compact package. Of course, other sizes and weights may be used as needed or desired. In addition, various components of the optical crystal assembly 200 (such as the internal mount 208, base 210, and spring cover 220) can be fabricated to have matching or substantially matching coefficients of thermal expansion.

Figure 11:
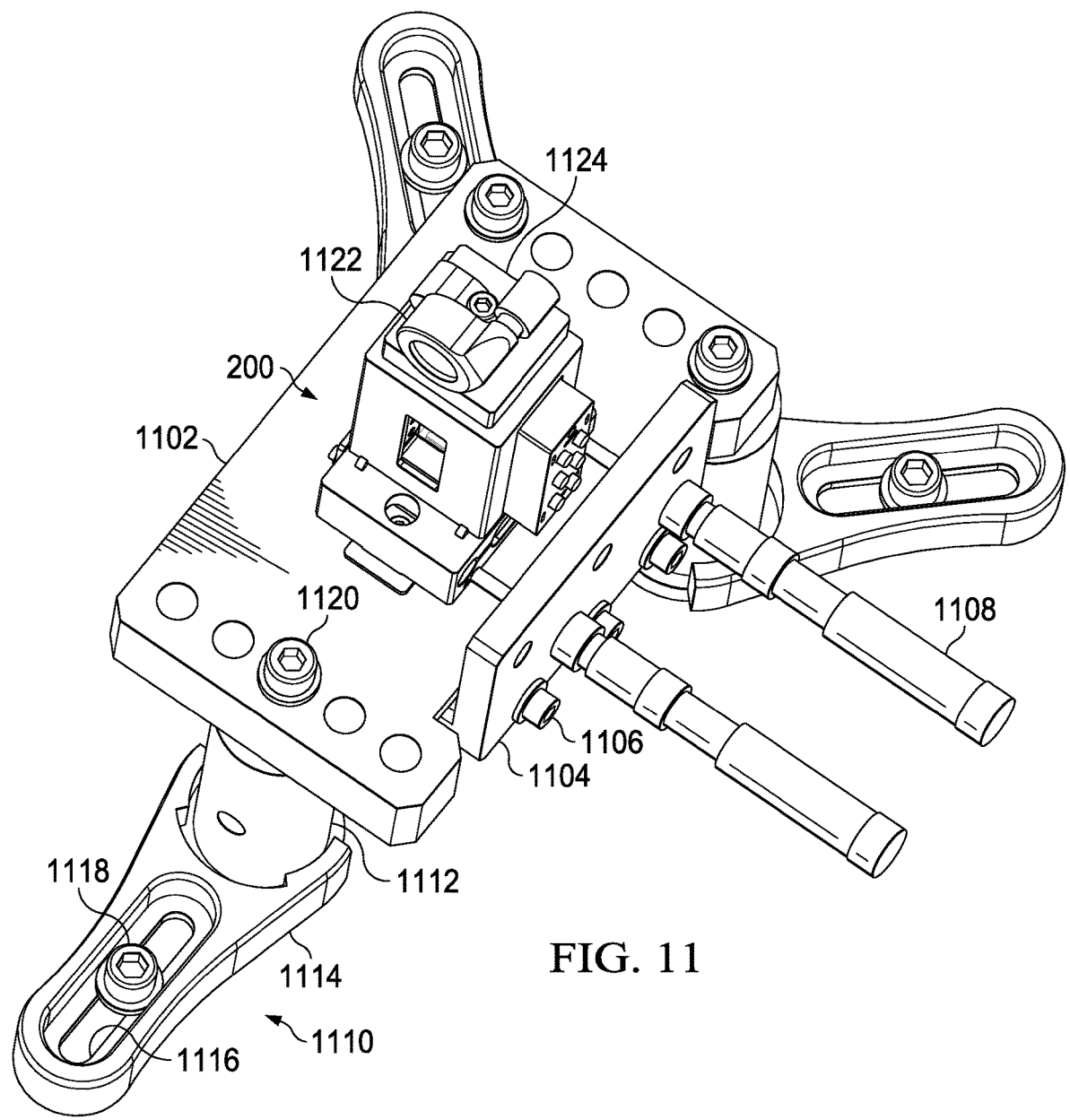
FIG. 11 illustrates example mounting and adjustment of the ultra-stable dual-mode operation optical crystal assembly for harmonic conversion in accordance with this disclosure.

FIG. 11 illustrates example mounting and adjustment of the ultra-stable dual-mode operation optical crystal assembly 200 for harmonic conversion in accordance with this disclosure. As shown in FIG. 11, the optical crystal assembly 200 can be secured to a base plate 1102. For example, the connectors 256 can be passed through the openings 258 in the base 210 of the optical crystal assembly 200 and used to secure the base 210 (and thereby the optical crystal assembly 200) to the base plate 1102.

In this example, a side plate 1104 can also be secured to the base plate 1102 via connectors 1106, such as bolts, or integrated with the base plate 1102. Adjustment tools 1108 can be coupled to the side plate 1104, and portions of the adjustment tools 1108 can extend through the side plate 1104 and contact the optical crystal assembly 200. The adjustment tools 1108 can be used to finely adjust the position or orientation of the optical crystal assembly 200 on the base plate 1102 before the optical crystal assembly 200 is secured to the base plate 1102 using the connectors 256. This can help to facilitate precise alignment of a desired crystal axis of the optical crystal 202 with an incoming beam. Note, however, that the optical crystal assembly 200 may be positioned in any other suitable manner. Each plate 1102 and 1104 can be formed from any suitable material(s), such as one or more metals. Each plate 1102 and 1104 can also be formed in any suitable manner and have any suitable size, shape, and dimensions.

In this example embodiment, the base plate 1102 can be coupled to another structure using multiple stands 1110 that collectively form a semi-kinematic three-point mounting interface. Each stand 1110 here includes a post 1112 that is coupled to a rotatable foot 1114. Each post 1112 of the stands 1110 helps to hold the base plate 1102 at a desired distance from another structure. Each rotatable foot 1114 includes a slot 1116 through which a connector 1118 (such as a bolt) can pass. The connectors 1118 can be used to secure the rotatable feet 1114 to another structure, thereby coupling the stands 1110 (and therefore coupling the base plate 1102 and the optical crystal assembly 200) to the other structure. The presence of the slots 1116 and the rotatable nature of the feet 1114 help to provide a great deal of flexibility in where the connectors 1118 can attach to another structure.

Each post 1112 and each foot 1114 can be formed from any suitable material(s), such as one or more metals. Each post 1112 and each foot 1114 can also be formed in any suitable manner and have any suitable size, shape, and dimensions. In this example, the base plate 1102 is coupled to each stand 1110 using a connector 1120, such as a bolt. However, the base plate 1102 may be coupled to the stands 1110 in any other suitable manner, or the base plate 1102 may be integral with at least a portion of the stands 1110. Note that the stands 1110 here can be designed to support relatively large rotations of the optical crystal assembly 200 on the base plate 1102, which can provide yet another degree of freedom that can be used to help position and align the optical crystal 202 as needed or desired in a larger system.

A tooling mirror 1122 may be placed on or over the optical crystal assembly 200 and used to help align the optical crystal 202 in a larger system, such as when the tooling mirror 1122 is used to reflect a laser beam in order to assess the alignment of the optical crystal 202. The tooling mirror 1122 may also be used to support stability assessment, such as when the structure in FIG. 11 is subjected to vibrations and the tooling mirror 1122 is used to determine whether the optical crystal assembly 200 is properly secured. The tooling mirror 1122 includes any suitable mirror used to support alignment, stability, or other assessment. Note, however, that the tooling mirror 1122 may be replaced with any other suitable structures that can be used for assessment purposes or other purposes. Also note that the tooling mirror 1122 or other component may be coupled directly to the optical crystal assembly 200 or indirectly, such as by using a device mount 1124 that attaches to the optical crystal assembly 200. For instance, the tooling mirror 1122 or the device mount 1124 may be coupled to the optical crystal assembly 200 by passing connectors 242 through the tooling mirror 1122 or device mount 1124, through the holes 244 of the external cover 236, and into the openings 804 of the internal mount 208.

As described above, the same optical crystal assembly 200 may be selectively used in a CPM mode of operation or in an NCPM mode of operation. In the CPM mode of operation, the optical crystal 202 typically operates at or near ambient temperature. Very precise crystal alignment is needed and can be obtained by using the various degrees of freedom described above to position the optical crystal 202 appropriately. In the NCPM mode of operation, the optical crystal 202 typically operates at an elevated temperature range (relative to the CPM mode of operation) depending on the crystal type, and crystal alignment is less important. In either mode of operation, very precise thermal control can be obtained using the heaters 204a-204b, such as by using closed-loop PID or other control, but significantly different temperature setpoints may be used in the different modes of operation. The adiabatic "oven" design provided by the external cover 236 of the optical crystal assembly 200 here helps in obtaining very precise crystal temperature control in either mode of operation. This allows harmonic wavelength conversion to be performed in a desired mode of operation using a suitable optical crystal 202 within a common, compact, thermally-controlled package.

Moreover, the optical crystal assembly 200 supports various self-contained, built-in, precision semi-kinematic degree of freedom mechanical adjustments. This helps to optimally align a desired crystal axis of the optical crystal 202 and compensate for NCPM beam walk-off errors. Further, the optical crystal assembly 200 provides a thermally-balanced design featuring tuned thermal conduction and radiative control, and the optical crystal 202 can be symmetrically regulated with the dual embedded heaters 204a-204b for precise bulk temperature and gradient control. Beyond that, ultra-low outgassing components, such as ceramic heaters 204a-204b, may be used for contamination control at elevated temperatures, and thermal interface materials may be omitted between the optical crystal 202 and the heaters 204a-204b. In addition, the optical crystal assembly 200 can support a ruggedized design with low stress placed on the optical crystal 202, and the optical crystal assembly 200 can be configurable for various types of optical beams (such as high-aspect ratio beams or round beams). The optical crystal assembly 200 may be particularly well adapted for slab, planar waveguide, or combined multi-fiber beam shapes.

Although FIGS. 2 through 11 illustrate one example of an ultra-stable dual-mode operation optical crystal assembly 200 for harmonic conversion and related details, various changes may be made to FIGS. 2 through 11. For example, various structural components in FIGS. 2 through 11 may be easily redesigned to perform the same or similar functions using different form factors. As particular examples, the actual shapes of the internal mount 208, base 210, and external cover 236 may be modified as needed or desired while still performing the various functions described above.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a non-linear optical crystal configured to perform harmonic wavelength conversion;
first and second heaters contacting opposite sides of the optical crystal, the first and second heaters configured to heat the optical crystal;
first and second backing plates configured to hold the first and second heaters in contact with the optical crystal;
an internal mount defining a space configured to receive at least a portion of the optical crystal; and
an external cover around at least a portion of the internal mount.

2. The apparatus of claim 1, wherein:
the optical crystal is held in place only by the first and second heaters; and
top, bottom, and side surfaces of the optical crystal are uncovered.

3. The apparatus of claim 1, wherein:
the first backing plate is configured to push against the first heater in order to push the first heater against the optical crystal; and
the second backing plate is coupled to the internal mount and is configured to maintain the second heater in a fixed position.

4. The apparatus of claim 3, further comprising:
multiple springs configured to apply a spring force against the first backing plate; and
a spring cover configured to partially compress the springs when the spring cover is coupled to the internal mount.

5. The apparatus of claim 1, further comprising:
a base coupled to or integral with the internal mount, the base comprising first and second portions; and
an adjuster configured to alter a spacing between the first and second portions of the base in order to provide azimuth adjustment of the optical crystal.

6. The apparatus of claim 1, further comprising:
a base plate;

a base coupled to or integral with the internal mount, the base coupled to the base plate; and a three-point mounting interface configured to mount the base plate to an external structure.

7. The apparatus of claim 1, wherein the first and second heaters are configured to heat the optical crystal to a specified absolute crystal temperature and with a specified temperature gradient.

8. The apparatus of claim 1, wherein the external cover is configured to substantially limit radiative and conductive coupling between the optical crystal and an external environment.

9. The apparatus of claim 1, wherein the apparatus defines a package in which the optical crystal is selectively operated in a critically phased matched (CPM) mode of operation or a non-critically phase matched (NCPM) mode of operation.

10. The apparatus of claim 1, further comprising:
a laser configured to generate an input optical beam;
wherein the optical crystal is configured to receive the input optical beam and generate an output optical beam, the output optical beam representing a harmonic of the input optical beam.

11. A method comprising:
placing a non-linear optical crystal within an internal mount defining a space configured to receive at least a portion of the optical crystal, the optical crystal configured to perform harmonic wavelength conversion;
positioning the optical crystal between first and second heaters, the first and second heaters contacting opposite sides of the optical crystal, the first and second heaters configured to heat the optical crystal;
using first and second backing plates to hold the first and second heaters in contact with the optical crystal; and
placing an external cover around at least a portion of the internal mount.

12. The method of claim 11, wherein:
the optical crystal is held in place only by the first and second heaters; and
top, bottom, and side surfaces of the optical crystal are uncovered.

13. The method of claim 11, wherein:
the first backing plate pushes against the first heater in order to push the first heater against the optical crystal; and the second backing plate is coupled to the internal mount and maintains the second heater in a fixed position.

14. The method of claim 13, further comprising:
using multiple springs to apply a spring force against the first backing plate; and
partially compressing the springs using a spring cover coupled to the internal mount.

15. The method of claim 11, wherein:
a base is coupled to or integral with the internal mount, the base comprising first and second portions; and
the method further comprises using an adjuster to alter a spacing between the first and second portions of the base in order to provide azimuth adjustment of the optical crystal.

16. The method of claim 11, wherein:
a base is coupled to or integral with the internal mount; and
the method further comprises:
coupling the base to a base plate; and
mounting the base plate to an external structure using a three-point mounting interface.

17. The method of claim 11, wherein the first and second heaters are configured to heat the optical crystal to a specified absolute crystal temperature and with a specified temperature gradient.

18. The method of claim 11, wherein the external cover is configured to substantially limit radiative and conductive coupling between the optical crystal and an external environment.

19. The method of claim 11, wherein a package comprising the first and second heaters, the first and second backing plates, the internal mount, and the external cover allows the optical crystal to be selectively operated in a critically phased matched (CPM) mode of operation or a non-critically phase matched (NCPM) mode of operation.

20. The method of claim 11, further comprising:
positioning the optical crystal within a beam path of an input optical beam;
wherein the optical crystal is configured to receive the input optical beam and generate an output optical beam, the output optical beam representing a harmonic of the input optical beam.

* * * * *